(12) United States Patent
Tarte et al.

(10) Patent No.: US 9,884,621 B2
(45) Date of Patent: Feb. 6, 2018

(54) AUTONOMOUS PARKING CONTROLLER AND METHOD BASED ON AMBIENT CONDITIONS RELATING TO A VEHICLE PARKING LOCATION

(71) Applicant: Toyota Motor Engineering & Manufacturing North America, Inc., Erlanger, KY (US)

(72) Inventors: Christopher T. Tarte, Ann Arbor, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/186,384

(22) Filed: Jun. 17, 2016

(65) Prior Publication Data

US 2017/0361835 A1    Dec. 21, 2017

(51) Int. Cl.
    *B60W 30/06*      (2006.01)
    *G08G 1/14*      (2006.01)
    *B60W 40/04*      (2006.01)
    *B60W 50/14*      (2012.01)
    (Continued)

(52) U.S. Cl.
CPC ............ *B60W 30/06* (2013.01); *B60W 40/04* (2013.01); *B60W 50/14* (2013.01); *G08G 1/149* (2013.01); *B60W 2050/0002* (2013.01); *B60W 2050/0043* (2013.01); *B60W 2400/00* (2013.01); *B60W 2550/30* (2013.01); *B60W 2550/402* (2013.01);
(Continued)

(58) Field of Classification Search
CPC ............ B60W 50/14; B60W 2750/40; B60W 2050/0002; B60W 2400/00; B60W 2550/30; B60W 2550/408; B60W 2550/402; B60W 2050/0043; G08G 1/149; H04B 7/24
See application file for complete search history.

(56) References Cited

U.S. PATENT DOCUMENTS

| | | |
|---|---|---|
| 8,948,955 B2 | 2/2015 | Zhu et al. |
| 2014/0052336 A1* | 2/2014 | Moshchuk ........... B62D 5/0463 701/41 |
| 2015/0073645 A1 | 3/2015 | Davidsson et al. |

(Continued)

OTHER PUBLICATIONS

NYU, "Re-Programming Mobility Trends & Signals Report", NYU Wagner rudin center for transportation policy & management, Aug. 14, 2014, (67 pages).

*Primary Examiner* — Rodney Butler
(74) *Attorney, Agent, or Firm* — Christopher G. Darrow; Darrow Mustafa PC

(57) ABSTRACT

Devices and methods in an autonomous parking controller for a vehicle are disclosed. When the vehicle is located at a parking location, the method determines whether the parking location includes a parking restriction. When the parking location includes the parking restriction, the example method compares the parking restriction with at least one restriction threshold. When the parking restriction compares unfavorably with the at least one restriction threshold, the example method, while at the parking location, monitors for a change in at least one of a plurality of ambient conditions relative to the vehicle. When the example method detects the change, the vehicle is autonomously relocated to another location to alleviate the active obstruction.

19 Claims, 4 Drawing Sheets

(51) Int. Cl.
*H04B 7/24* (2006.01)
*B60W 50/00* (2006.01)

(52) U.S. Cl.
CPC ... *B60W 2550/408* (2013.01); *B60W 2750/40* (2013.01); *H04B 7/24* (2013.01)

(56) References Cited

U.S. PATENT DOCUMENTS

| | | | |
|---|---|---|---|
| 2015/0149265 A1* | 5/2015 | Huntzicker | B60W 30/06 705/13 |
| 2015/0221142 A1* | 8/2015 | Kim | G07C 5/008 701/31.5 |
| 2015/0241241 A1 | 8/2015 | Cudak et al. | |
| 2015/0346727 A1* | 12/2015 | Ramanujam | B62D 15/0285 701/23 |
| 2016/0125736 A1* | 5/2016 | Shaik | G08G 1/14 701/23 |

\* cited by examiner

AUTONOMOUS PARKING CONTROLLER AND METHOD BASED ON AMBIENT CONDITIONS RELATING TO A VEHICLE PARKING LOCATION

BACKGROUND

Vehicle parking provides challenges in urban areas, or in areas where parking is restrictive, for example, in festival or concert style events. It is desirable that an autonomous, driverless, or driver-assisted vehicle have an advanced self-driving or autonomous capability to relocate to another location when the vehicle presents an active obstruction at a parking location that includes parking restrictions.

SUMMARY

Devices and methods for an autonomous parking controller are disclosed.

In one implementation, a method in an autonomous parking controller for a vehicle is disclosed. In the method, when the vehicle is located at a parking location, determining whether the parking location includes a parking restriction. When the when the parking location includes the parking restriction, the method compares the parking restriction with at least one restriction threshold. When the parking restriction compares unfavorably with the at least one restriction threshold, the method while at the parking location, monitors for a change in at least one of a plurality of ambient conditions relative to the vehicle. The change being monitored is indicative that the vehicle is creating an active obstruction. When the method detects the change in the at least one of the plurality of ambient conditions, the method autonomously relocates the vehicle to another location to alleviate the active obstruction. Upon relocation, the method continues, by transmitting, via a wireless communication interface, a relocated location coordinate to user equipment of the vehicle user. The method is further operable to receive, via the wireless communication interface, a summon message to autonomously deliver the vehicle according to a vehicle user location identified by the user equipment.

In another implementation, an autonomous parking controller for a vehicle. The controller includes a plurality of sensors disposable about the vehicle and one or more processors coupled to a wireless communication device to service communication with user equipment of a vehicle user, and in communication with the plurality of sensors. The one or more processors being for controlling the operations of the autonomous parking controller and memory for storing data and program instructions used by the one or more processors. The one or more processors are configured to execute instructions stored in the memory and to identify a parking restriction for a parking location. The one or more processors are further configured to, when a parking restriction is presented, compare the parking restriction with at least one restriction threshold. When the comparison is unfavorable, the one or more processors are configured to, while at the parking location, monitor for a change in at least one of a plurality of ambient conditions relative to the vehicle, indicating that the vehicle is creating an active obstruction. When the change is detected, the one or more processors are configured to autonomously relocate the vehicle to another location to alleviate the active obstruction. Upon relocation, the one or more processors are further configured to transmit, via the wireless communication interface, a relocated location coordinate to the user equipment of the vehicle user.

In yet another implementation, an autonomous parking device is disclosed. The autonomous parking device includes one or more sensor devices, a wireless communication interface, and a computing device. The plurality of sensors are disposable about a vehicle to monitor at least one of a plurality of ambient conditions relative to the vehicle. The wireless communication interface is operable to service communications. The computing device is coupled to the wireless communication interface and in communication with the one or more sensor devices. The computing device includes one or more processors being for controlling the operations of the autonomous parking controller and memory for storing data and program instructions used by the one or more processors. The one or more processors are configured to execute instructions stored in the memory and to identify a parking restriction for a parking location. The one or more processors are further configured to, when a parking restriction is presented, compare the parking restriction with at least one restriction threshold. When the comparison is unfavorable, the one or more processors are configured to, while at the parking location, monitor for a change in at least one of a plurality of ambient conditions relative to the vehicle, indicating that the vehicle is creating an active obstruction. When the change is detected, the one or more processors are configured to autonomously relocate the vehicle to another location to alleviate the active obstruction. Upon relocation, the one or more processors are further configured to transmit, via the wireless communication interface, a relocated location coordinate to the user equipment of the vehicle user.

BRIEF DESCRIPTION OF THE DRAWINGS

The description makes reference to the accompanying drawings wherein like reference numerals refer to like parts throughout the several views, and wherein.

DETAILED DESCRIPTION

An autonomous parking controller of a vehicle is described herein. One example method provides that, in an autonomous parking controller, determining whether a vehicle is at a parking location that creates a potential for the vehicle to cause an active obstruction, such as a parking location in front of a mail box, in front of a neighbor's drive, double-parked, etc. The method considers the nature of a parking restriction for the location. When the parking restriction compares unfavorably to a restriction threshold, the autonomous parking controller is operable to monitor changes in ambient conditions about the vehicle. For example, the autonomous parking controller may monitor changes from other vehicles through vehicle-to-vehicle communication, from parking stands or traffic beacons through vehicle-to-infrastructure communications, from other individuals such as approaching the vehicle through speech recognition, physical presence, etc. Upon determining that the vehicle presents an active obstruction, the autonomous vehicle controller can autonomously relocate the vehicle to another location to alleviate the active obstruction, and advise a user, through user equipment, a relocated location coordinate for the vehicle.

An advantage of the method of the present disclosure is to provide, in effect, momentary location of the vehicle. The vehicle may then be subsequently relocated to another location when the vehicle presents an active obstruction in view of parking restrictions for a current parking location.

Figure 1:
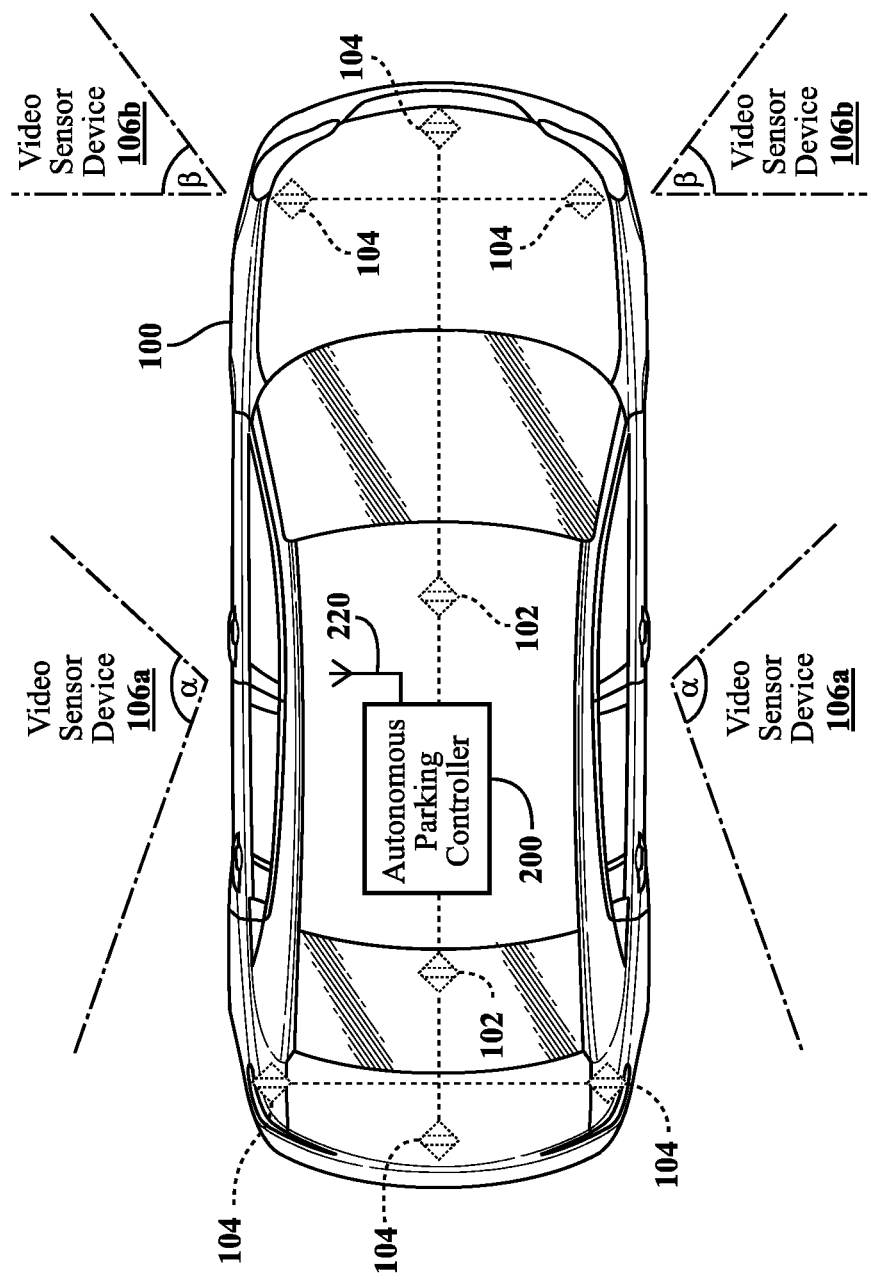
FIG. 1 shows a schematic view of a vehicle including an autonomous parking controller.

FIG. 1 is a schematic illustration of a vehicle 100 including an autonomous parking controller 200. A plurality of sensor devices 102, 104 and 106 are in communication with the parking controller 200. The plurality of sensor devices 102, 104 and 106 can be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device. Communication between the sensors may be on a bus basis, and may also be used or operated by other systems of the vehicle 100. For example, the sensors 102, 104 and 106 may be coupled by a Body Electronic Area Network (BEAN), a Controller Area Network (CAN) bus configuration, an Audio Visual Communication-Local Area Network (AVC-LAN) configuration, and/or a combination of communication-system architectures to provide digital communications between devices and systems of the vehicle 100. Moreover, the sensors 102, 104 and/or 106 may be further coupled to the autonomous parking controller 200 via such communication-system architectures.

The sensor devices 102, 104 and 106 operate to monitor ambient conditions relating to the vehicle 100, including audio, visual, and tactile changes to the vehicle environment. The sensor devices in include audible sensor devices 102, sensory input devices 104, and video sensor devices 106a and 106b.

The audible sensor devices 102 provide audible sensing of the ambient conditions of the vehicle. With speech recognition capability, the audible sensor devices 102 may receive instructions to move, or to receive other such directions. The audible sensor devices 102 may be provided, for example, by a nano-electromechanical system (NEMS) or micro-electromechanical system (MEMS) audio sensor omnidirectional digital microphone, a sound-triggered digital microphone, etc.

The sensory input devices 104 provide tactile or relational changes in the ambient conditions of the vehicle, such as an approaching person, object, vehicle, etc. The sensory input devices 104. The one or more of the sensory input devices 104 can be configured to capture changes in velocity, acceleration, and/or distance to these objects in the ambient conditions of the vehicle 100, as well as the angle of approach. The sensory input devices 104 may be provided by a Light Detection and Ranging (LIDAR) system, in which the sensory input devices 104 may capture data related to laser light returns from physical objects in the environment of the vehicle 100. The sensory input devices 104 may also include a combination of lasers (LIDAR) and milliwave radar devices.

The video sensor devices 106a and 106b include associated fields of view. For the example of FIG. 1, the video sensor device 106a has a three-dimensional field-of-view of angle-α, and the video sensor device 106b has a three-dimensional field-of-view of angle-β, with each video sensor having a sensor range for video detection.

In the various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, etc.).

In relocation operations from a current parking location by the autonomous parking controller 200, the video sensor devices 106a and 106b may be further deployed to read lane markings and determine vehicle positions with the road to facilitate the relocation of the vehicle 100.

For controlling data input from the sensors 102, 104 and 106, the respective sensitivity and focus of each of the sensor devices may be adjusted to limit data acquisition based upon speed, terrain, activity around the vehicle, etc.

For example, though the field-of-view angles of the video sensor devices 106a and 106b may be in a fixed relation to the vehicle 100, the field-of-view angles may be adaptively increased and/or decreased based upon the vehicle's driving mode, such as a highway driving mode to take in less of the ambient conditions in view of the more rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

Also, some of the sensors may effectively be blocked depending upon the driving mode of the vehicle 100. For example, when the vehicle 100 is traveling at highway, or even residential, speeds, the audible sensor devices 102 simply detect white noise from the air moving across the microphone pick-up and may not be sufficiently filtered to remove the extraneous data input. In such instances, the input from the audible sensor devices 102 may be switched to an off or placed in a sleep mode until the vehicle 100 returns to a lower rate of speed.

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In autonomous mode, a computing device, which may be provided by the autonomous parking controller 200, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device. For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device 100 issues commands to the various vehicle systems to direct their operation, rather than such vehicle systems being controlled by the vehicle user.

Figure 2:
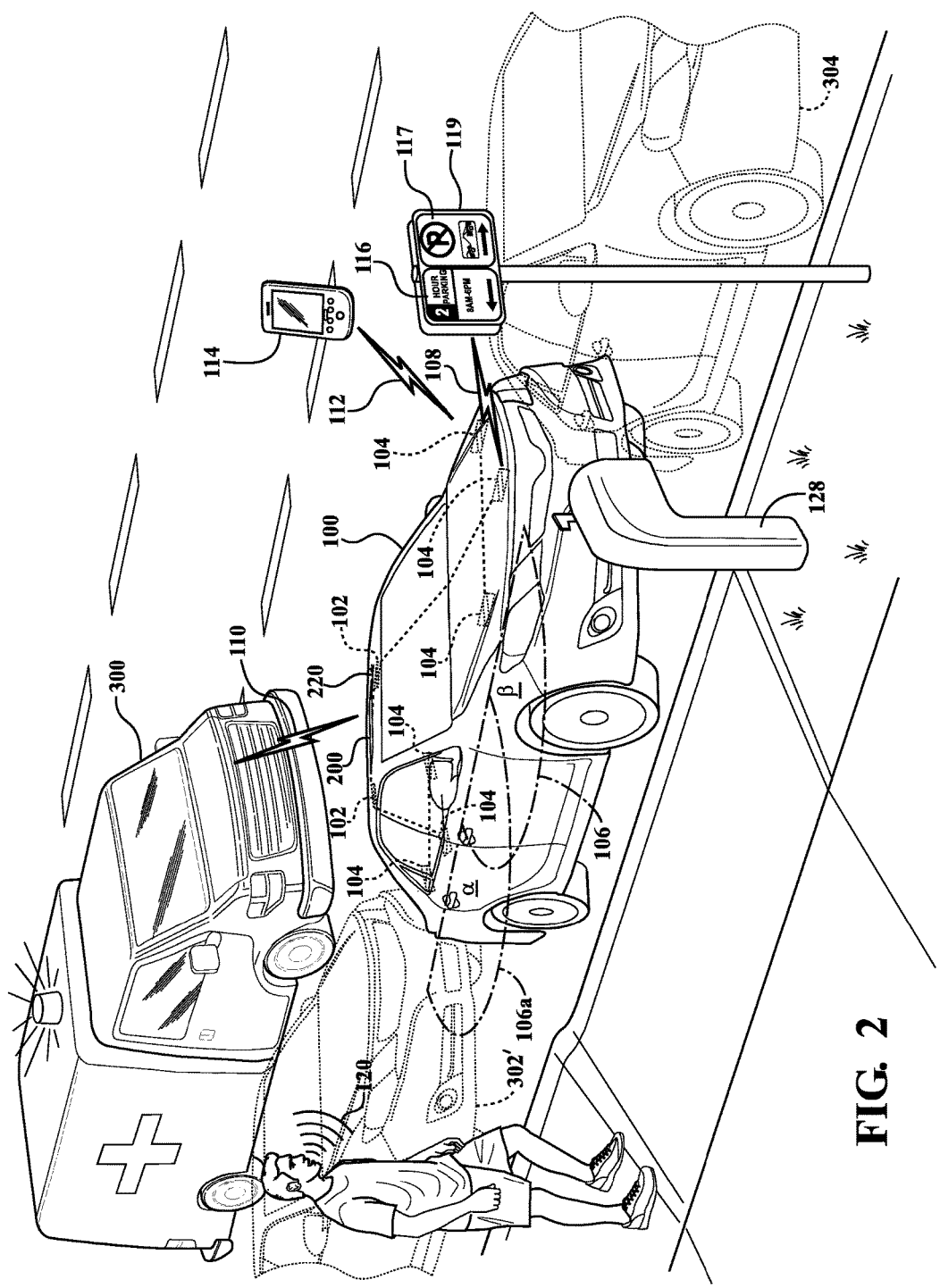
FIG. 2 shows a perspective view of the vehicle of FIG. 1 in a parking mode of operation at a parking location as an example of monitoring ambient conditions relative to the vehicle.
Figure 3:
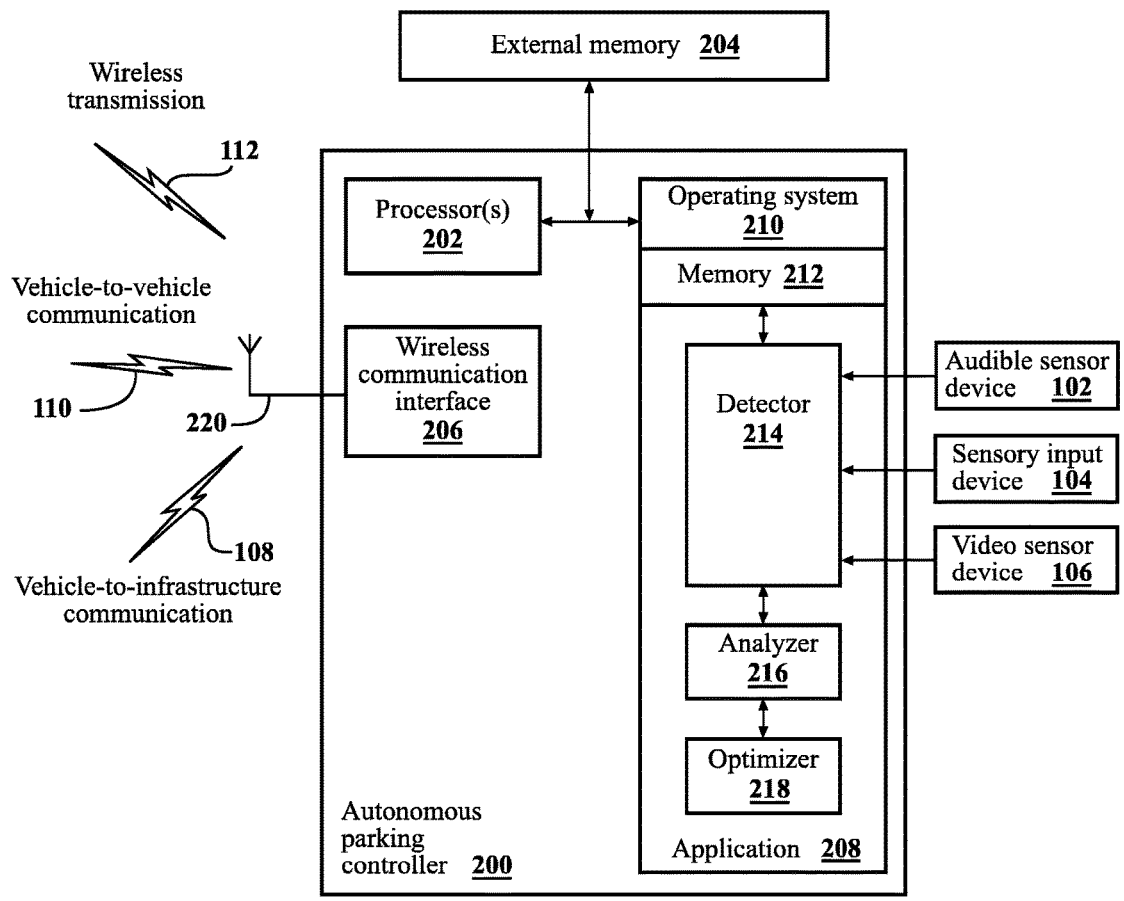
FIG. 3 is a block diagram of the autonomous parking controller of FIGS. 1 and 2.
Figure 4:
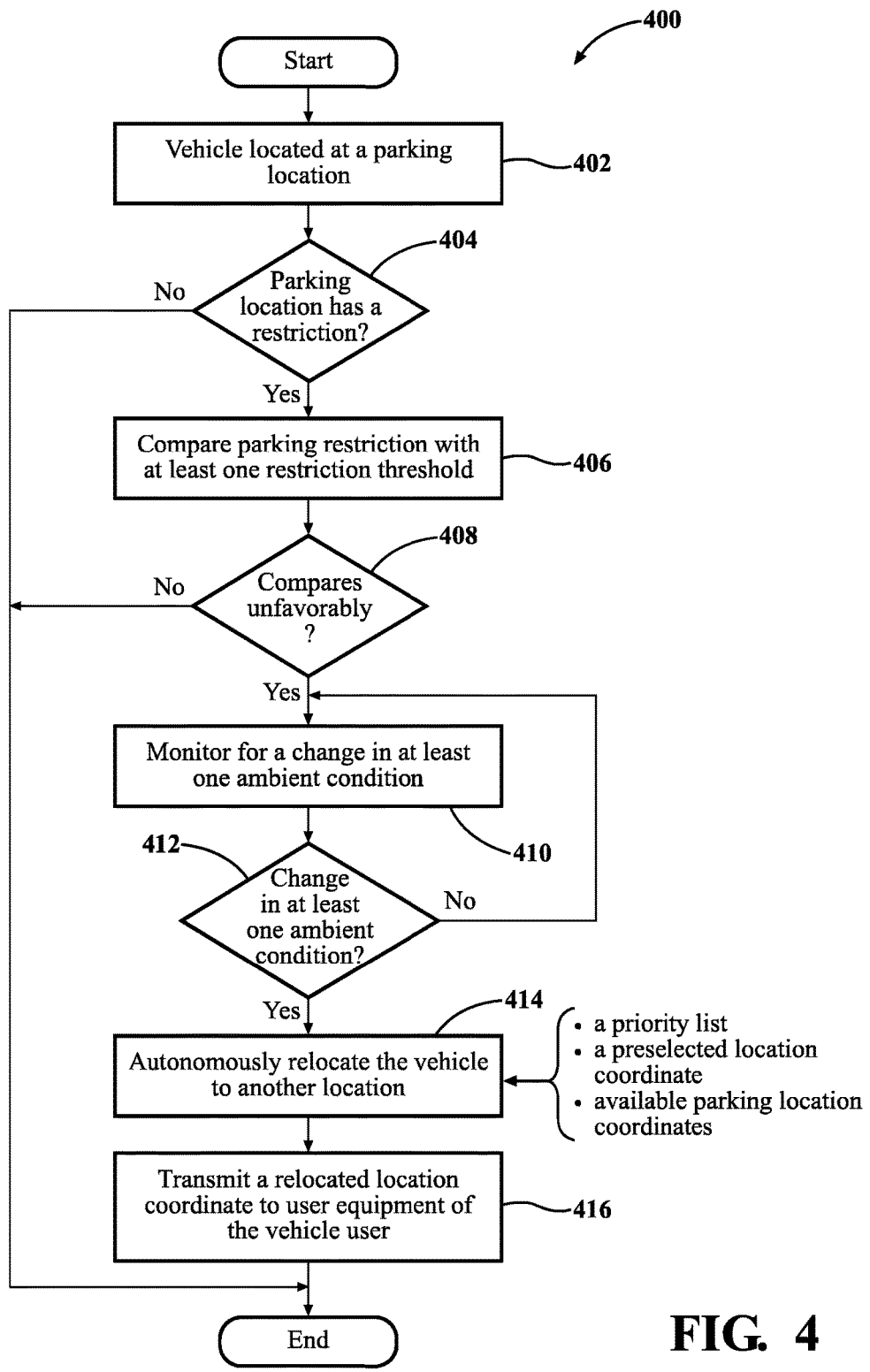
FIG. 4 is an example process for an autonomous parking controller using monitoring and detection for an active obstruction.

As shown in FIG. 1, the autonomous parking controller 200 is configured to provide wireless communication with a user device through the antenna 220, other vehicles (vehicle-to-vehicle), and/or infrastructure (vehicle-to-infrastructure), which is discussed in detail with respect to FIGS. 2-4.

FIG. 2 is a perspective view of the vehicle 100 in the example of a parking mode at a parking location. In general, a parking location may be an unrestricted or restricted parking location. The parking restriction may be accessed through GPS data, a navigational map, vehicle-to-infrastructure communications (such as at a parking lot kiosk and/or a parking meter), optical code recognition (such as signage for the parking location), published governmental parking ordinances, etc. The informational database for parking locations and associated parking restrictions may be accessed by the autonomous parking controller 200 via a wireless communication interface coupled to the antenna 220.

Parking information may be provided by third party providers, for example, tourist attraction websites provide information on parking and parking restrictions, ballparks, stadiums, museums, etc. Also, search engines may also provide data accessible by performing a parking search, which the autonomous parking controller 202 may conduct based upon destination information provided by the vehicle user. Parking location information may then be provided to the user through a vehicular graphic user interface illustrating the map potential, as well as provided to the user via the user equipment 114 over the wireless transmission 112.

User equipment 114 is any device used directly by an end-user to communicate. It can be a hand-held telephone/smart phone, a laptop computer equipped with a mobile a suitable communications adapter, or any other device.

As may be appreciated, the wireless transmission 112 connection with the user equipment 114 and autonomous parking controller 200 is a simplified representation. The wireless communications may be provided via a wireless network standards specification, which range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

In instances, when the autonomous parking controller 200 determines the presence of a parking restriction, the parking restriction may be compared with a restriction threshold. Parking restrictions may be assigned numeric values to reflect their restrictive characteristics. For example, unrestricted parking may be designated by a "0" value. Parking restrictions may be designated by increasing "obstruction" values," which indicate a likelihood of towing or a monetary fine for the vehicle 100. Parking restrictions may also be designated by the likelihood of damage or theft to the vehicle.

The comparison result may indicate either a favorable or unfavorably comparison. For example, a favorable comparison may indicate that the parking restriction relates to wireless payment to park at that parking location. In such an instance, the autonomous parking controller 200 may be configured to accommodate wireless parking for the vehicle 100. The status of the parking restriction may be periodically compared with the threshold to determine whether the parking location has lapsed to an unfavorable condition (such as the time has expired on the wireless payment, a meter is no longer effective generally during a given time of day, such as during rush hour, etc.).

In contrast, an unfavorable comparison may indicate a likelihood that the parking restriction incurs a penalty for the parking location. Such penalty may include possible vehicle towing or a monetary fine of the vehicle 100. Examples of these parking restrictions include (a) parking in front of a public driveway, (b) parking in front of a private driveway, (c) within a certain distance to a crosswalk at an intersection, (d) within a certain distance on the approach to a flashing signal, stop sign, and/or traffic-control signal, (e) where an official sign prohibits standing, (f) blocking a mail box, etc. Also, as indicated above, the parking restriction may relate to damages to the vehicle or otherwise theft of the vehicle.

In the example of FIG. 2, the vehicle 100 is shown parallel parked between two other vehicles 302 and 304, indicated by phantom lines. The parking location of the vehicle 100 has a parking restriction 117 indicated by the municipal signage. For the example, the parking restriction 117 is a "no parking" zone. As may be appreciated, the parking restriction 117 may be determined through GPS data, a navigational map, vehicle-to-infrastructure communications 108 (such as at a parking lot kiosk, a parking meter, a beacon stand, etc.), optical code recognition of text by video sensor device 106a and/or 106b (such as signage for the parking location), governmental parking ordinances accessible through the Internet, etc.

Upon parking at the parking location, the presence of a parking restriction 117 is determined by the autonomous parking controller 200. In the example of FIG. 2, the examples of parking restrictions include a parking location across a private or public driveway, a parking restriction indicated by an ordinance 116 of the parking signage, and also a location that restricts a home or business owner's access to a mail box 128.

The parking location for the vehicle 100 includes a parking restriction 117. In the example provided in FIG. 2, the parking restriction 117 compares unfavorably to at least one restriction threshold because of the likelihood of a penalty that may include vehicle towing or a monetary fine of the vehicle 100.

A change in at least one of the ambient conditions indicates that the parking location of the vehicle may no longer simply be unfavorable, but creates an active obstruction 118. An active obstruction 118 results from a need for the vehicle 100 to be moved. The autonomous parking controller 200 is configured to autonomously relocate the vehicle 100 to another location to alleviate the active obstruction 118.

Also, adjacent to the "no parking" zone is an example of a dynamic parking restriction 119, in which a time limitation is placed on parking (e.g., two hour parking) and a time when the parking restriction is favorable (e.g., from 8:00 am to 6:00 pm). As may also occur, a parking location may transition from a non-restricted, or a less restrictive, parking location to restricted parking location. For example, a wireless parking meter may be effective only during business hours, and revert to a "no parking" zone outside of business hours. In this instance, the autonomous parking controller 200 may monitor the ambient conditions relative to the vehicle 100.

When the vehicle is at a parking location having an unfavorable parking restriction, the autonomous parking controller 200 monitors for a change in at least one of an ambient condition relative to the vehicle 100. An example of a change may be a temporal change, a messaging change, or an activity.

The change in the at least one ambient condition may be sensed via the video sensor device 106, the audible sensor device 102, the sensory input device 104, and/or a wireless communication interface of the autonomous parking controller 200 to receive status messaging through vehicle-to-infrastructure communication and/or vehicle-to-vehicle communications.

An example of a temporal change is timed parking expiring, such as with sign 116, which has a two-hour parking limit during business hours.

An example of a change may be a message transmitted through a vehicle-to-infrastructure communication 108, and/or as a vehicle-to-vehicle communication 110. In a vehicle-to-infrastructure communication 108, the parking restriction 117 may be wirelessly communicated to the autonomous parking controller 200, indicating the locations where parking is restricted as a no-parking location, or time limited such as the dynamic parking restriction 119. For a change in messaging, the infrastructure may message that a monetary fine or other penalty will be assessed against the vehicle. In this example, a change in the ambient conditions relative to the vehicle 100 is the passage of time, in which upon reaching the time limit, the vehicle 100 becomes an active obstruction 118.

In vehicle-to-vehicle communication 110, another vehicle 300 messages the vehicle 100 through dedicated short-range radio communications to exchange messages. In the present example, the vehicle 300 (such as an ambulance, an emergency vehicle, a home or business owner vehicle, etc.) may indicate a need to access the drive 126 actively obstructed by the vehicle 100. As another example, the communication 110 may be delivered by a postal vehicle seeking access to the mailbox 128. Moreover, the vehicle-to-vehicle communication 110 may be a chain message passed wirelessly by other vehicles. In effect, the autonomous parking controller 200 receives advance notice of a change in the at least one of the plurality of ambient conditions to indicate that the vehicle 100 presents an active obstruction 118.

With respect to vehicle-to-vehicle communications 110, as well as vehicle-to-infrastructure communications 108, data communications may be conducted under various vehicular communications specifications, such as the SAE J2735 Basic Safety Message specification, and along a specified frequency spectrum (e.g., 5.9 GHz radio spectrum band unlicensed in Wi-Fi data communications).

The audible sensor device 102 may operate to monitor for an audible change in at least one of a plurality of ambient conditions relative to the vehicle 100. The audible sensing 120 may include changes such as shouting (change in amplitude or decibels) relative to the vehicle 100, a voice recognition circuitry of the autonomous parking controller 200 operable to detect a person speaking (e.g., "move from the front of my drive," "you are blocking my mailbox," etc.).

The video sensor devices 106a and 106b may operate to monitor for visual changes by visually sensing for at least one of a plurality of ambient conditions relative to the vehicle 100. Visual sensing may include the video sensor devices 106a and/or 106b, which may visually sense the approach of the person towards the vehicle within a predetermined boundary about the vehicle 100. For example, the video sensor devices 106a and 106b each may be capable of image recognition, such as whether an approaching person is in uniform, or whether the image carriers a blunt instrument intended to damage the vehicle 100.

The sensory input devices 104 may operate to monitor for tactile changes by touch or approaching touch input changes for at least one of a plurality of ambient conditions relative to the vehicle 100. The sensory input devices 104 may be configured to sense a touch, and further determine whether the touch is intended or by accident. In such instances, with a LIDAR based configuration, target resolution may be refined with shorter pulses, while detectors and electronics have sufficient bandwidth to develop the image. As with autonomous, or driverless, vehicle operation, the sensory input devices 104 may provide for obstacle detection, and changes in at least one of the ambient condition relative to the vehicle 100.

In the sensor devices 102, 104 and 106, a predetermined sensitivity boundary may be deployed. The predetermined sensitivity boundary may be based upon characteristics of the parking location, such as the amount of traffic, an expected amount and location of pedestrian traffic relative to the vehicle 100, local events, etc. For example, in a city's downtown district, more foot traffic and noise is present, warranting a less sensitivity to ambient conditions relative to the vehicle 100. In contrast, in a more suburban area, there may be less foot traffic and noise, providing greater senility for the sensor devices 102, 104 and 106. As may be further appreciated, different sensitivity boundaries may be provided for each of the sensor devices 102, 104 and 106, based upon the environment of the parking location.

The parking restriction may be a dynamic parking restrictions 119. For example, the dynamic metered-parking restriction 119 may be provided by a parking meter of the parking location that is not effective during periods of time. The limitations on the effectiveness of the parking meter may be visually, such as through the ordinance 116 posted on the signage, through the wireless communication interface.

When a change in the at least one of the plurality of ambient conditions is detected, either by the sensors 102, 104 and 106, or the through vehicle-to-infrastructure communication 108 and/or vehicle-to-vehicle communication 110, the autonomous parking controller 200 operates to autonomously relocate the vehicle to another location to alleviate the active obstruction presented by the vehicle 100.

When a change is not sensed in at least one of the ambient conditions relative to the vehicle, the autonomous parking controller continues monitoring at operation 410.

Relocation of the vehicle to another location may be based upon a priority list including a sequence of location coordinates. These may be provided by a vehicle user, a cloud-based parking service, or otherwise selected by a user through a graphic user interface of the vehicle 100 in communication with the autonomous parking controller 200, or through the user equipment of the vehicle user.

Moreover, while at the parking location, the autonomous parking controller 200 may monitor for other parking locations that lack parking restrictions. Such monitoring may be provided through GPS mapping data, Internet data relating to local parking availability, parking availability as communicated through vehicle-to-infrastructure communications 108 and/or vehicle-to-vehicle communication 110.

Upon the vehicle 100 relocating, the autonomous parking controller 200 transmits to user equipment 114 of the vehicle user a relocated location coordinate via the wireless transmission 112 provided by a wireless communication interface and antenna 220. The user equipment 114 may include a data transfer application. The relocated location coordinate may also include information relating to the condition of the vehicle, the distance relocated from the parking location, and the reason for the relocation.

The autonomous parking controller 200 may also receive a summon message for the vehicle 100 to autonomously retrieve the vehicle user, which may be located via the user equipment 114.

As may be appreciated, the wireless transmission 112 may be a direct or an indirect wireless communication, such that a cloud or Internet-based data path may be used in the wireless communication 108, 110 and/or 112.

In some implementations, a corresponding data transfer application may be operable on the autonomous parking controller 200, which may send and receive digital data to and from other entities via a network.

Throughout the disclosure, the term "digital data" may be used to represent any digital data undergoing the transfer operations described herein. The digital data may include, but is not limited to, update data used to update services in the user equipment 114 (e.g., software update data for updating software applications installed in the vehicle 100, navigation updates, infotainment updates), content data describing content updates subscribed by a user (e.g., latest movies, music, podcasts, etc.), and any other digital data to be transferred to the user equipment 114. In some implementations, the digital data may include mobile system data associated with the user equipment 114, and the digital data may be transferred from the user equipment 114 to a cloud-based server.

FIG. 3 is a block diagram of an autonomous parking controller 200. The autonomous parking controller 200 can be any type of vehicle-installed, handheld, desktop, or other form of single computing device, or can be composed of multiple computing devices. The controller 200 includes a processor 202, external memory 204, a wireless communication interface 206, and an application 208.

The processor 202 in the controller 200 can be a conventional central processing unit or any other type of device, or multiple devices, capable of manipulating or processing information. As may be appreciated, processor 202 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processor 202 may have an associated memory and/or memory element 212, which may be a single memory device, a plurality of memory devices, and/or embedded circuitry of the processing module 202. Such a memory device may be a read-only memory, random access memory, volatile memory, non-volatile memory, static memory, dynamic memory, flash memory, cache memory, and/or any device that stores digital information.

Note that if the processor 202 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 202 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 202 executes, hard coded and/or operational instructions corresponding to at least some of the steps and/or functions illustrated FIGS. 1-4.

The external memory 204 in the controller 200 can be a random access memory device (RAM) or any other suitable type of storage device The application 208 includes an operating system 210, memory 212. The memory 212 can include data that is accessed by the processor 202 using a bus architecture. The memory 204 can also include an operating system 110 and installed applications 112 resident in the memory 212, which may be local to the controller 200 for achieving suitable operational processing speeds. The applications 208 including programs and or methods executed by the processor 202 to perform autonomous parking features and methods described herein.

The external memory 204 can be provided, for example, as a memory card, flash drive, or any other form of computer readable medium. The application 208 can be stored in whole or in part in the external storage 204 and loaded into the memory 212 as needed for processing. The controller 200 can also include, or be coupled to, one or more sensors 102, 104 and 106 through a detector 214, for capturing data representative of a change in at least one of a plurality of ambient conditions for a vehicle as set out by the embodiments herein. When the audible sensor device 102, sensory input device 104 and/or the video sensor device 106, alone or in combination, capture data reflecting such a change in the ambient conditions indicating that a vehicle is actively obstructing a roadway, the autonomous parking controller 200 can alleviate the active obstruction by prompting relocation of a vehicle.

When the sensory input device 104 captures data for a LIDAR system, ranging data relating to intensity or reflectivity returns of the environment surrounding the vehicle can be captured. In the example of the autonomous parking controller 200 described in FIG. 3, the application 208 stored in the memory 212 includes at least a detector 214, an analyzer 216, and a data optimizer 218. In general, data captured by the sensors 102, 104 and/or 106 can be used by one or more of applications of the vehicle to determine the environment surroundings of the vehicle, and to also improve positional accuracy upon alleviating an active obstruction by the vehicle, which may then be provided to the user equipment of the vehicle user by the wireless transmission 112 via the antenna 220.

The antenna 220, with the wireless communications interface 206, operates to provide wireless communications with the autonomous parking controller 200, including vehicle-to-infrastructure communication 108, vehicle-to-vehicle communication 110, and/or wireless transmission 112.

Such communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

FIG. 4 is an example process 400 for an autonomous parking controller using monitoring and detection for an active obstruction by a vehicle. The operations described in connection with the process 400 can be performed at the autonomous parking controller 200, using the application 208 (see FIG. 3). The operations described in connection with the process 400 can also be embodied as a non-transitory computer readable storage medium including program instructions executable by one or more processors that, when executed, cause the one or more processors to perform the operations described herein. For example, the operations described in connection with the process 400 can be stored in the external memory 204, the memory 212, or a combination thereof, and executed by the processor 202.

At operation 402, a vehicle is located at a parking location. The parking location may be manually selected by the vehicle user, may be physically selected by a vehicle user, or may be autonomously parked by a driverless or autonomous system of the vehicle, which incorporates sensor data input by the sensors 102, 104 and/or 106 (see, e.g., FIGS. 1-3).

At operation 404, when the parking location includes a parking restriction, the parking restriction is compared, at operation 406, with at least one restriction threshold at operation 406.

When, at operation 408, the parking restriction for the parking location compares favorably with the at least one restriction threshold, the vehicle will not create an active obstruction and the autonomous parking controller will not be have a need to relocate the vehicle. Examples of favorable comparisons are parking locations that accept wireless payment by a vehicle user through the autonomous parking controller, assigned/designated parking spaces in parking facilities that have markings recognized by the autonomous parking controller through the sensors 102, 104 and/or 106 (see FIGS. 1 and 2), recognition by the autonomous parking controller of wireless payment through third party sources (e.g., RFID-based toll tags), etc. The autonomous parking controller continues, at intervals and/or at time marks, to compare at operation 406 whether the parking restriction becomes and/or is unfavorable at operation 408.

When, at operation 408, there is an unfavorable comparison from operation 406, the parking restriction unfavorable relative to the vehicle. In other words, the vehicle may present an active obstruction. An active obstruction is considered as blocking access to a structure, building, residence, roadside object, etc. An active obstruction may also be considered as an adverse action likely to take place with the vehicle because of the parking restriction. For example, the vehicle may be located where it may be towed or impounded, may be issued a ticket and/or fine for being in the location, etc.

While at the parking location, the autonomous parking controller, at operation 410, monitors for a change in at least one ambient condition relative to the vehicle. For example, the allotted time may expire for a conventional wireless parking meter and as a result cause an unfavorable parking restriction in which the vehicle may be removed or fined. As a further example, a timed-duration parking, per government ordinance (e.g., see FIG. 2), may become unfavorable because of the expiration of allowable time for that parking location.

For example, the autonomous parking controller changes in at least one ambient condition may in the form of communications from other vehicles through vehicle-to-vehicle communication, from parking stands or traffic beacons through vehicle-to-infrastructure communications, from other individuals such as approaching the vehicle through speech recognition, physical presence, etc.

Upon determining that the vehicle presents an active obstruction due to the change in at least one ambient condition, the autonomous vehicle controller can autonomously relocate the vehicle at operation 414 to another location to alleviate the active obstruction, and at operation 416 advise a vehicle user, through user equipment, a relocated location coordinate for the vehicle.

Generally, a conventional meter does not have a capacity for vehicle-to-infrastructure communication, and accordingly, could not accept wireless payment for extending the parking period for the vehicle. In a driver-assist mode, in which a vehicle user locates or parks the vehicle at such a parking location, parking restriction may be favorable for a duration of time allotted by the parking meter. In this example, the autonomous parking controller of the disclosure may assess the parking time-duration with the conventional meter based a vehicle user's wireless input to their user equipment for the amount of parking time purchased. On the other hand, in a driver-less mode, a conventional parking meter is not able to accept wireless payment or conventional hard-currency payments, and the parking restriction with respect to that parking location begins as unfavorable.

Upon expiration of the time-duration for the conventional meter or for a parking location in general (due to local ordinances, for example), the autonomous parking controller, at operation 410, while at the parking location, monitoring for a change in at least one of a plurality of ambient conditions relative to the vehicle, wherein the change in the at least one of the plurality of ambient conditions indicates that the vehicle is creating an active obstruction.

In operation 418, following relocation of the vehicle at operation 414, the autonomous parking controller, at operation 416, transmits via a wireless communication interface a relocated location coordinate to user equipment of the vehicle user, the wireless communication interface servicing communication with the user equipment. The relocated location coordinates may be expressed in decimal degrees, or in degrees, minutes and seconds, and further provided in a map format for display on the graphic user interface of the user equipment of the vehicle user.

As may be further appreciated, the autonomous parking controller may receive, via the wireless communication interface, a summon message to autonomously deliver the vehicle to a vehicle user location identified by the user equipment. The location may be the actual user equipment, serving as a beacon alongside a roadway. The user equipment may also identify a location away from the vehicle user—that is, a location remote from the vehicle user in which the owner may need to travel by foot or otherwise to access the vehicle. As may be appreciated, restrictive parameters may be deployed, such that the vehicle is bounded by customary vehicle travel paths.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

Thus, there has been described herein an apparatus and method, as well as several embodiments including a preferred embodiment, for implementing an autonomous parking controller for a vehicle.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in an autonomous parking controller for a vehicle, the method comprising:
   when located at a parking location, determining whether the parking location includes a dynamic parking restriction being operable to cause a favorable comparison to transition to an unfavorable comparison over a period of time with regard to at least one restriction threshold, the dynamic parking restriction including at least one of:
      a dynamic metered-parking restriction such, wherein a parking meter of the parking location is not effective during periods of time as announced visually and/or via communication through the wireless communication interface; and
      a governmental ordinance designating permissible parking during the periods of time; and
   when the parking location includes the dynamic parking restriction, comparing the dynamic parking restriction with the at least one restriction threshold;
   when the dynamic parking restriction compares unfavorably with the at least one restriction threshold:
      while at the parking location, monitoring for a change in at least one of a plurality of ambient conditions relative to the vehicle, wherein the change in the at least one of the plurality of ambient conditions indicates that the vehicle is creating an active obstruction;
      when the change in the at least one of the plurality of ambient conditions is detected, autonomously relocating the vehicle to another location to alleviate the active obstruction; and
      transmitting, via a wireless communication interface, a relocated location coordinate to user equipment of the vehicle user, the wireless communication interface being operable to service communications with the user equipment.

2. The method of claim 1, wherein the monitoring of the at least one of the plurality of ambient conditions comprising at least one of:
   visual sensing by a video sensor device;
   audible sensing by an audible sensor device;
   tactile sensing by a sensory input device to detect touch and/or approaching touch input;
   a vehicle-to-vehicle communication by the wireless communication interface to receive status messaging; and
   a vehicle-to-infrastructure communication by the wireless communication interface to receive status messaging.

3. The method of claim 1 further comprising:
   when the dynamic parking restriction compares favorably with the at least one restriction threshold, periodically comparing the dynamic parking restriction to the at least one restriction threshold to determine whether the dynamic parking restriction compares unfavorably.

4. The method of claim 1, wherein the dynamic parking restriction includes at least one of:
   a metered-parking restriction;
   a parking restriction such that a parking meter of the parking location is not effective at periods of time; and
   a no-obstruction parking restriction.

5. The method of claim 1, wherein the autonomously relocating the vehicle to the another location is based on at least one of:
   a priority list including a sequence of location coordinates;
   a preselected location coordinate by the vehicle user; and
   an available other parking location coordinate based on GPS mapping data.

6. The method of claim 1, further comprising:
   receiving, via the wireless communication interface, a summon message to autonomously deliver the vehicle according to a vehicle user location identified by the user equipment.

7. An autonomous parking controller for a vehicle comprising:
   a wireless communication interface to service communication with user equipment of a vehicle user;
   a plurality of sensor devices disposable about the vehicle;
   one or more processors coupled to the wireless communication interface and in communication with the plurality of sensors, the one or more processors for controlling operations of the autonomous parking controller; and
   a memory coupled to the one or more processors, the memory for storing data and program instructions used by the one or more processors, wherein the one or more processors are configured to execute instructions stored in the memory to:
park the vehicle at a parking location;
transmit, via the wireless communication interface, a location coordinate of the vehicle at the parking location to the user equipment of the vehicle user;
determine, by the autonomous parking controller, whether the parking location includes a dynamic parking restriction being operable to cause a favorable comparison to transition to an unfavorable comparison over a period of time with regard to at least one restriction threshold, the dynamic parking restriction including at least one of:
a dynamic metered-parking restriction such, wherein a parking meter of the parking location is not effective during periods of time as announced visually and/or via communication through the wireless communication interface; and
a governmental ordinance designating permissible parking during the periods of time; and
when the parking location includes the dynamic parking restriction, compare the dynamic parking restriction with at least one restriction threshold;
when the dynamic parking restriction compares unfavorably with the at least one restriction threshold:
monitor, by the plurality of sensor devices, for a change in at least one of a plurality of ambient conditions relative to the vehicle, wherein the change in the at least one of the plurality of ambient conditions indicates that the vehicle is creating an active obstruction;
when the change in the at least one of the plurality of ambient conditions is detected, autonomously relocate the vehicle to another location to alleviate the active obstruction; and
transmit, via the wireless communication interface, a relocated location coordinate to the user equipment of the vehicle user.

8. The autonomous parking controller of claim 7, wherein the monitoring of the at least one of the plurality of ambient conditions comprising at least one of:
visual sensing by a video sensor device;
audible sensing by an micro phonic sensor device;
tactile sensing by a sensory input device to detect touch and/or approaching touch input;
a vehicle-to-vehicle communication by the wireless communication interface to receive status messaging; and
a vehicle-to-infrastructure communication by the wireless communication interface to receive status messaging.

9. The autonomous parking controller of claim 7 further comprising:
monitoring, by the autonomous parking controller, for parking locations without parking restrictions.

10. The autonomous parking controller of claim 7, wherein the dynamic parking restriction includes at least one of:
a metered-parking restriction;
a parking restriction such that a parking meter of the parking location is not effective during periods of time; and
a no-obstruction parking restriction.

11. The autonomous parking controller of claim 7, wherein the autonomously relocating the vehicle to the another location is based on at least one of:
a priority list including a sequence of location coordinates;
a preselected location coordinate by the vehicle user; and
an availability of other parking location coordinates based on GPS mapping data.

12. The autonomous parking controller of claim 7, further comprising:
receiving, via the wireless communication interface, a summon message to autonomously deliver the vehicle according to a vehicle user location identified by the user equipment.

13. An autonomous parking device comprising:
one or more sensor devices disposable about a vehicle, the one or more sensor devices configured to monitor at least one of a plurality of ambient conditions relative to the vehicle; and
a wireless communication interface operable to service communications;
a computing device coupled to the wireless communication interface and in communication with the one or more sensor devices, the computing device including:
one or more processors, the one or more processors for controlling operations of the autonomous parking device;
a memory coupled to the one or more processors, the memory for storing data and program instructions used by the one or more processors, wherein the one or more processors are configured to execute instructions stored in the memory to:
when the vehicle is parked at a parking location:
transmit, via the wireless communication interface, a location coordinate of the parking location to the user equipment of the vehicle user;
determine, by the autonomous parking controller, whether the parking location includes a dynamic parking restriction being operable to cause a favorable comparison to transition to an unfavorable comparison over a period of time with regard to at least one restriction threshold, the dynamic parking restriction including at least one of:
a dynamic metered-parking restriction such, wherein a parking meter of the parking location is not effective during periods of time as announced visually and/or via communication through the wireless communication interface; and
a governmental ordinance designating permissible parking during the periods of time; and
when the parking location includes the dynamic parking restriction, compare the parking restriction with at least one restriction threshold;
when the dynamic parking restriction compares unfavorably with the at least one restriction threshold:
monitor for a change in the at least one of a plurality of ambient conditions relative to the vehicle, wherein the change in the at least one of the plurality of ambient conditions indicates that the vehicle is creating an active obstruction;
when the change in the at least one of the plurality of ambient conditions is detected, prompt autonomously relocation of the vehicle to another location to alleviate the active obstruction; and
when the vehicle is relocated, transmit via the wireless communication interface a relocated location coordinate to the user equipment of the vehicle user.

14. The autonomous parking device of claim 13, wherein the monitoring of the at least one of the plurality of ambient conditions comprising at least one of:
visual sensing by a video sensor device;

audible sensing by an auditory sensing device;
tactile sensing by a sensory input device to detect touch and/or approaching touch input;
a vehicle-to-vehicle communication by the wireless communication interface to receive status messaging; and
a vehicle-to-infrastructure communication by the wireless communication interface to receive status messaging.

15. The autonomous parking device of claim 13, wherein the one or more processors are configured to execute further instructions stored in the memory to:
receive, via the wireless communication interface, a summon message to autonomously deliver the vehicle according to a vehicle user location identified by the summon message.

16. The autonomous parking device of claim 13, wherein the dynamic parking restriction includes at least one of:
a metered-parking restriction;
a parking restriction such that a parking meter of the parking location is not effective at periods of time; and
a no-obstruction parking restriction.

17. The autonomous parking device of claim 13, wherein the autonomously relocating the vehicle to the another location is based on at least one of:
a priority list including a sequence of location coordinates;
a preselected location coordinate by the vehicle user; and
an available other parking location coordinate based on GPS mapping data.

18. The autonomous parking device of claim 1, wherein the one or more processors are configured to execute further instructions stored in the memory to:
receive, via the wireless communication interface, a summon message to autonomously deliver the vehicle according to a vehicle user location identified by the user equipment.

19. The autonomous parking device of claim 1, wherein the one or more processors are configured to execute further instructions stored in the memory to:
when the dynamic parking restriction compares favorably with the at least one restriction threshold, periodically compare the dynamic parking restriction to the at least one restriction threshold to determine whether the dynamic parking restriction compares unfavorably.

* * * * *